United States Patent
Kainthla et al.

[11] Patent Number: 5,952,124
[45] Date of Patent: Sep. 14, 1999

[54] RECHARGEABLE ELECTROCHEMICAL CELL WITH MODIFIED MANGANESE OXIDE POSITIVE ELECTRODE

[76] Inventors: Ramesh C. Kainthla, 1403 Riverstone Ct., College Station, Tex. 77845; A. John Appleby, 2810 Briarcreek Ct.; David J. Manko, 2508 Arbor Dr., both of Bryan, Tex. 77802

[21] Appl. No.: 08/898,172

[22] Filed: Jul. 22, 1997

[51] Int. Cl.$^6$ .......................... H01M 2/16; H01M 10/28
[52] U.S. Cl. .......................... 429/224; 429/229; 429/250
[58] Field of Search .................................. 429/142, 144, 429/206, 224, 229, 250

[56] References Cited

U.S. PATENT DOCUMENTS

| | | | |
|---|---|---|---|
| 4,451,543 | 5/1984 | Dzieciuch et al. | 429/206 |
| 4,520,005 | 5/1985 | Yao | 423/599 |
| 5,156,934 | 10/1992 | Kainthia et al. | 429/224 |
| 5,250,374 | 10/1993 | Zhang | 429/224 |
| 5,340,666 | 8/1994 | Tomantschger et al. | 429/59 |
| 5,395,714 | 3/1995 | Scarr | 429/229 |
| 5,419,986 | 5/1995 | Kainthla et al. | 429/224 |
| 5,516,604 | 5/1996 | Mieczkowska et al. | 429/224 |
| 5,532,085 | 7/1996 | Davis et al. | 429/224 |
| 5,660,953 | 8/1997 | Bai et al. | 429/224 |

FOREIGN PATENT DOCUMENTS

| | | | |
|---|---|---|---|
| 2125840 | 12/1995 | Canada | H01M 2/16 |

OTHER PUBLICATIONS

Linden, editor "Handbook of Batteries and Fuel Cells", McGraw–Hill publishers, p. 7–5. (no month available) 1983.

"The Rechargeability of Manganese Dioxide in Alkaline Electrolyte," K. Kordesch et al. *Elecrochemica. Acta*, 26, 1495 (Jan. 9, 1981).

"Rechargeable Alkaline Manganese Dioxide/Zinc Batteries," K. Kordesch et al. *Journal of Power Sources*, vol. 51, pp. 61–78 (Jun. 14, 1994).

"Rechargeable Manganese Oxide Electrodes," Yung Fang Yao, et al. *Journal of Electroanalytical Chemistry*, 223, 107 (Sep. 1986).

"Preparation and Electrochemical Behaviour of Doped Manganese Dioxide," Bauer et al. *Ber Bunsenges, Phys. Chem.*, 90, 1220 (1986) no month availvable.

"Rechargeable Cells with Modified $MnO_2$ Cathodes," M.A. Dzieciuch, et al. *Journal of the Electrochemical Society*, 135, 2415 (1988) (no month available).

"Rechargeable Mangnenese Oxide Electrodes," H.S. Wroblowa et al. *Journal of Electroanalytical Chemistry*, 238, 93 (1987) no month available.

*Primary Examiner*—Maria Nuzzolillo
*Assistant Examiner*—Carol Chaney
*Attorney, Agent, or Firm*—Graham & James LLP

[57] ABSTRACT

A rechargeable battery cell includes an anode with a major portion of active material, a cathode including $MnO_2$ doped with bismuth, and a separator between the cathode and anode which substantially prevents bismuth from migrating from the cathode to the anode. The rechargeable battery cell has a high cycle life and does not contain toxic compounds found in conventional rechargeable batteries.

30 Claims, 7 Drawing Sheets

RECHARGEABLE ELECTROCHEMICAL CELL WITH MODIFIED MANGANESE OXIDE POSITIVE ELECTRODE

BACKGROUND OF THE INVENTION

1. Field of the Invention

The present invention relates to rechargeable batteries, and more particularly relates to rechargeable alkaline $MnO_2$—Zn battery cells having improved cycle life.

2. Background Information

Manganese dioxide has been used extensively in primary, single-use battery cells and particularly in dry and alkaline manganese dioxide-zinc cells. These battery cells are generally made in a charged states, are used once and are then discarded.

Recently, in view of both expanding energy requirements and environmental concerns about proper waste disposal of used battery cells, great emphasis has been placed upon the development of readily rechargeable battery cells which can be used in a wide range of equipment and consumer products. Rechargeable batteries would be useful in many applications such as electric vehicles and consumer electronic products. Examples of other areas particularly suited to the use of rechargeable batteries include satellites, space travel equipment and as backups for solar energy systems.

It is desirable to continue to use manganese dioxide in batteries because of its low cost and its stability. Unlike other rechargeable batteries, manganese-oxide/zinc batteries do not generally contain toxic components. The commonly used form of manganese dioxide itself is not readily rechargeable. Furthermore, rechargeability is essentially impossible if the material has been deep discharged to greater than 50 percent of the theoretical two-electron capacity.

Various attempts have been made at producing rechargeable compounds containing manganese dioxide. Kordesch, et al., *Electrochemica. Acta*, 26, 1495 (1981), discloses that in certain circumstances electrolytic manganese dioxide may be recharged in the range of 100 times. However, this is only true if the material is discharged to less than 30 percent of the theoretical one-electron capacity, which is equivalent to less than 15 percent of the theoretical two-electron capacity. This restriction requires shallow discharge which severely limits the amount of energy which can be retrieved from the cell. It also reduces the rechargeability or eliminates rechargeability entirely if the manganese dioxide is accidentally discharged beyond the limit. Thus, there is very little practical application to the rechargeability.

Kordesch, *Journal of Power Sources*, Vol. 51, p. 61–78 (1994), discloses an alkaline battery comprising manganese dioxide having limited rechargeability. The battery includes a relatively large amount of $MnO_2$ cathode material in comparison with conventional throw-away cells, and is designed to avoid the formation of $Mn(OH)_2$. Due to non-uniform discharge of the manganese dioxide cathode, the recharge capacity of the cell drops approximately exponentially from cycle to cycle, resulting in an unsatisfactory life of only about 10 to 20 cycles.

U.S. Pat. No. 4,520,005 to Yao discloses a chemical process to prepare a compound which includes manganese dioxide doped with bismuth and/or lead. The resulting compound is rechargeable, however, its method of preparation is a complex and slow batch process. Furthermore, the compound has lower density than is desirable in many commercial applications. Density can be a critical factor in battery electrode materials because of volume limitations in battery cells. In a given volume, a more dense material produces more energy than would a material of lower density such as the material disclosed in U.S. Pat. No. 4,520,005. The low density powder with poor electronic conductivity requires the addition of large quantities of graphite (about 90 weight percent) to make enough electronic contact to render the mixture sufficiently electronically conducting and rechargeable. After optimizing the overall capacity with this high-graphite mixture in a C-size cell, the cell would only have a maximum capacity of about 1.2 Ah based on discharge and charge to 80 percent of two electrons. This low capacity is impractical for a competitive C-cell. Such cells discharging at 1.0 V, even at high rate, are also impractical replacements for alkaline primary cells discharging at an average of 1.25 V, and nickel-cadmium or nickel-hydrogen secondary cells discharging at 1.2 V, since they will not match the electrical requirements of typical loads.

The background research which led to the development of the compounds described in U.S. Pat. No. 4,520,005 has been described in Yao et al., *Journal of Electroanalytical Chemistry*, 223, 107 (1987). The objective was to use an $MnO_2$ starting material with a modified lattice which would not collapse when the $Mn^{2+}$ reduction stage was reached. Hydrated compositions known as birnessites and buserites contain sheets of $H_2O$ and $OH^-$ trapped between two-dimensional sheets of edge-shared $Mn^{4+}O_6$ layers, which in naturally-occurring compounds are held together by anions such as $Na^+$. The authors attempted to show that incorporation of cations into these layers, e.g., by ion-exchange after preparation of the layered birnessite-type compounds, could prevent ultimate lattice collapse on reduction to $Mn^{2+}$, provided that the exchanged ions remained in the lattice. The ions of a large number of metallic elements were examined as possible substituents, but with the exception of bismuth and lead, none conferred adequate rechargeability after complete reduction. It is also of interest that $Mn(OH)_2$ compositions doped with $Al^{3+}$, $Ca^{2+}$, $Ba^{2+}$ and $Mg^{2+}$ were examined by Bauer et al., *Ber. Bunsenges. Phys. Chem.* 90, 1220 (1986). Only slight rechargeability of $MnO_2$ was observed by Bauer et al., the $Ba^{2+}$-doped $Mn(OH)_2$ being rechargeable to the extent of about 91 mAh/g, or 15% of the theoretical 2-electron capacity. This is too low to be practical.

As noted above, the two metals whose ions Yao et al. found did give close to the theoretical two-electron capacity when ion-exchanged into $MnO_2$ compounds with the birnessite lattice were bismuth and lead, or mixtures thereof. U.S. Pat. No. 4,520,005 indicates how such compounds may be made. As stated above, their lack of utility in secondary batteries make them of limited practical application. Another problem observed with these bismuth and/or lead doped birnessite materials is their sensitivity to the presence of dissolved zinc as $Zn(OH)_4^{2-}$ in alkaline electrolytes when attempts were made to use them in secondary $MnO_2$—Zn cells. This was discussed by Dzieciuch et al., *Journal of the Electrochemical Society*, 135, 2415 (1988). This paper gave evidence for the formation of a stable mixed $Zn—Mn^{3+}$ oxide, heterolite, which could not be further charged. In this paper and in U.S. Pat. No. 4,451,543, Dzieciuch et al. described a secondary $MnO_2$—Zn cell using a modified bismuth and/or lead doped birnessite cathode material, in which methanol was added to the 9 molar KOH electrolyte to suppress the solubility of $Zn(OH)_4^{2-}$ from greater than 1 molar to below approximately 0.1 molar. This resulted in improved cyclability, 25 percent of the theoretical 2-electron capacity of the positive electrode being retained after 100 cycles, which was maintained for a further 100 cycles. However, the positive electrode contained only 8.3 weight percent of birnessite material, the remainder being graphite containing 13.8 weight percent of acetylene black. In an optimized C-cell, the practical capacity after 100 cycles would only be 0.4–0.5 Ah, which is only about 20 percent of the capacity of a conventional Ni—Cd secondary cell of the same dimensions.

In another prior art approach, manganese dioxide is physically mixed with oxides of bismuth, lead or mixtures thereof (Wroblowa, et al., *Journal of Electroanalytical Chemistry*, 238, 93 (1987)). An electrode made in accordance with this method including manganese dioxide doped with bismuth oxide was shown to be rechargeable up to 250 cycles, but with a continuous drop in capacity as the number of cycles increased. In addition, the physical mixing process is time consuming and may lead to non-homogeneous mixtures, thereby affecting the performance of the electrodes. Moreover, the electrodes prepared with physical mixing require several electrochemical cycles for activation and use. The resulting material is not suitable for sealed cells because of the problem of gas evolution. In cells incorporating commercially-available battery separators, the slightly-soluble bismuth compound finds its way to the zinc anode, where bismuth metal deposits, giving a high-area bismuth black surface on which gaseous hydrogen is evolved. This results in self-discharge, with the accompanying danger of mechanical failure of the sealed cell.

In another method disclosed in U.S. Pat. No. 5,156,934 to Kainthla et al., which is incorporated by reference herein, commercially available electrolytic manganese dioxide or commercially available chemical manganese dioxide is used. The particles of the prepared electrolytic or chemical manganese dioxide are coated with bismuth hydroxide or lead hydroxide. The electrode prepared with the bismuth-coated product shows good rechargeability and sufficient density and conductivity for commercial application. However, the material prepared in accordance with this method has limited usefulness in sealed battery cells. Typically, a zinc anode and commercially available separator materials would be used. When using separator materials in alkaline batteries having potassium hydroxide as an electrolyte, gassing has been found to occur. This gassing is due to a reaction which occurs involving the unreacted bismuth oxide or bismuth hydroxide in the cell. A finite amount of the bismuth oxide or hydroxide is soluble in the alkaline electrolyte, which passes through the commercial separator to the anode compartment and deposits on the zinc electrode. The resultant gas buildup within the cell can present a problem in sealed cells.

U.S. Pat. No. 5,419,986 to Kainthla et al., which is incorporated by reference herein, discloses the preparation of a compound having improved electronic conductivity in comparison with the material described in U.S. Pat. No. 4,520,005. The material disclosed in U.S. Pat. No. 5,419,986 has relatively high density and can be electrochemically cycled in mixtures containing up to 90 percent of active material and 10 percent of a mixture of suitable graphites and carbons. A further advantage of the disclosed compound is that it is insensitive to the presence of dissolved $Zn(OH)_4^{2-}$, in the electrolyte, as has been demonstrated by operating an electrode of this material containing a zinc electrode against a nickel counter-electrode. The nickel electrode operates on either charge or discharge in a regime of electrochemical potential in which it is thermodynamically impossible for zinc to deposit, so zinc remains as $Zn(OH)_4^{2-}$ in the cathode area. Since the material cycles well even in the presence of $Zn(OH_4)^{2-}$, preventing $Zn(OH)_4^{2-}$ transport from the anode to the cathode is not a problem with the type of modified manganese dioxide described in U.S. Pat. No. 5,419,986. Whereas other investigators indicate that rechargeability of certain modified $MnO_2$ compounds results from doping of birnessite-type lattices, it has been determined that this explanation is not the reason for the rechargeability of the modified $MnO_2$ compound prepared according to U.S. Pat. No. 5,419,986.

Despite the foregoing efforts, a need still exits for a rechargeable $MnO_2$—$Zn$ battery having significantly improved life cycle.

SUMMARY OF THE INVENTION

An object of the present invention is to provide a rechargeable battery cell including a housing, a cathode within the housing comprising $MnO_2$ doped with bismuth, an anode within the housing comprising a major component of active material, a separator between the cathode and the anode which substantially prevents bismuth from moving from the cathode to the anode, a current collector within the housing, and an electrolyte within the housing.

Another object of the present invention is to provide a method of producing a rechargeable battery cell including the steps of providing a housing, providing an anode within the housing comprising a major amount of active material, providing a cathode within the housing comprising $MnO_2$, bismuth and an electrolyte, and providing a separator between the cathode and the anode which substantially prevents the bismuth from moving from the cathode to the anode during operation of the battery cell.

Another object of the present invention is to provide a method of recharging a battery cell including the steps of providing a battery cell having a cathode comprising $MnO_2$ and bismuth, an anode comprising a major portion of active material and a separator between the cathode and anode, and repeatedly discharging and charging the battery cell.

These and other objects of the present invention will be more readily understood from the following description.

BRIEF DESCRIPTION OF THE DRAWINGS

FIG. 2 is a graph showing a typical cycling curve of a modified Mn-oxide electrode in alkaline solution. FIG. 2 also shows the Bi-deposition current on a Ni sensor electrode held at −0.8 V vs Hg/HgO, indicating that there are Bi-ions present in the solution during the discharge process.

DETAILED DESCRIPTION OF THE PREFERRED EMBODIMENTS

Figure 1:
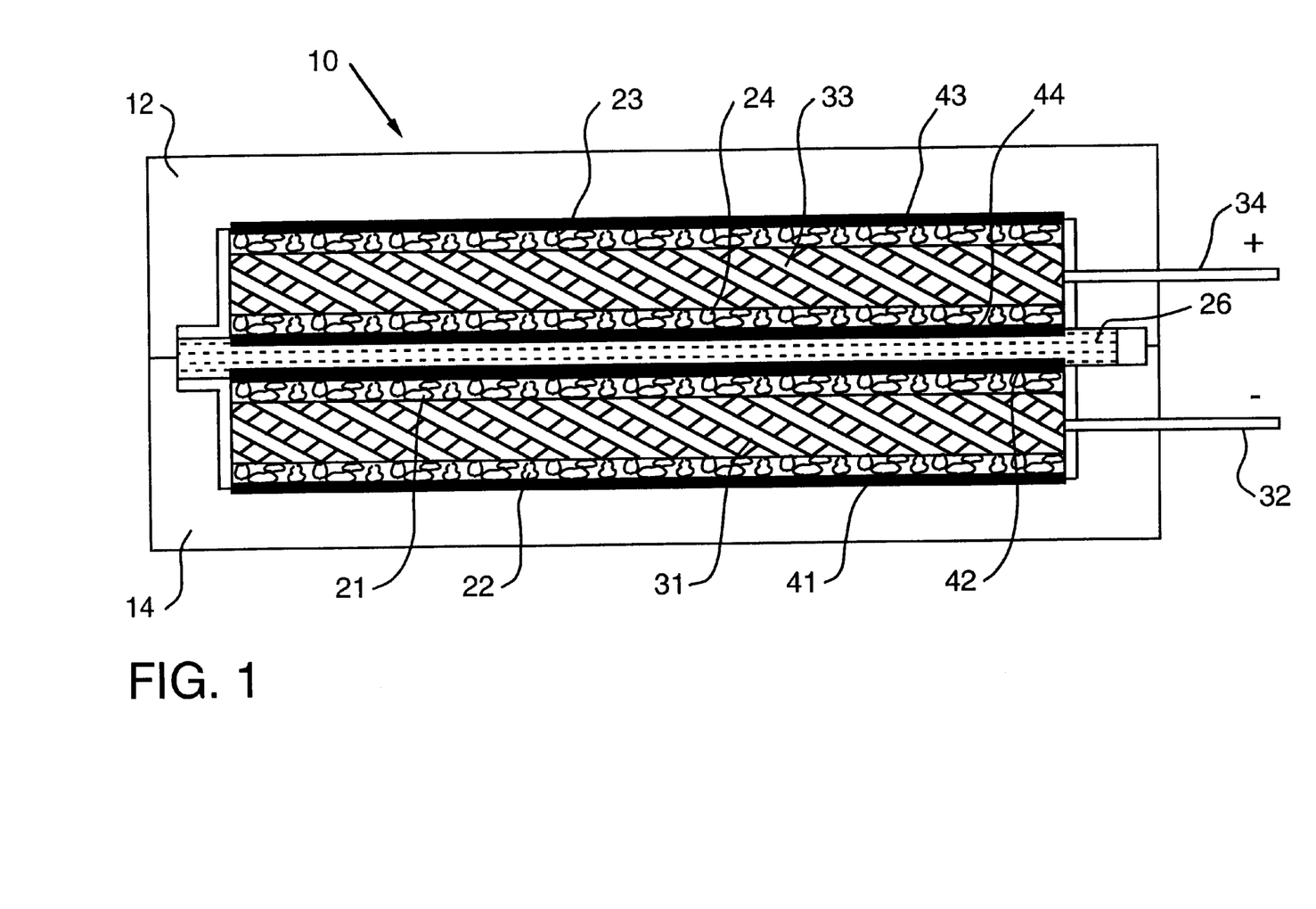
FIG. 1 is a partially schematic sectional view of a flat plate battery cell in accordance with an embodiment of the present invention.

FIG. 1 is a partially schematic sectional view of a battery cell 10 in accordance with an embodiment of the present invention. For purposes of clarity, the various layers shown in FIG. 1 are not drawn to scale. The battery cell 10 includes a housing comprising a first section 12 and a second section 14. In the embodiment shown in FIG. 1, the first section 12 and second section 14 of the housing are of a generally flat configuration. However, other battery cell configurations such as cylindrical cells, bipolar cells and jelly roll cells may be used in accordance with the present invention. The first section 12 and second section 14 of the housing are made of any suitable material such as plastic.

A negative electrode or anode 21, 22 is located within the housing of the battery cell 10. Although the anode 21, 22 shown in FIG. 1 is substantially flat, other anode configurations are within the scope of the present invention. The anode 21, 22 is made of a composition comprising an active material as its major component, as more fully described below.

A positive electrode or cathode 23, 24 is located within the housing of the battery cell 10. While a generally flat cathode 23, 24 is shown in FIG. 1, other configurations are within the scope of the present invention. The cathode 23, 24 is made of a material comprising $MnO_2$ and Bi.

A separator 26 is positioned between the anode 21, 22 and cathode 23, 24. As more fully described below, the separator 26 substantially prevents migration of Bi species from the cathode 23, 24 to the anode 21, 22.

As shown in FIG. 1, a current collector 31 is positioned between the anode layers 21, 22. The current collector 31 may be made of any suitable electrically conducting material such as copper mesh. While not shown in FIG. 1, the anode material may also fill the interstices of the mesh of the current collector. The current collector 31 is connected to a wire 32 which extends through the second section 14 of the housing. Another current collector 33 is positioned between the cathode layers 23, 24. The current collector 33 may be made of any suitable stable electrically conducting material such as nickel mesh. The cathode material also preferably fills the interstices of the current collector mesh. A wire 34 is connected to the current collector 33 and extends through the first section 12 of the housing.

As shown in FIG. 1, the battery cell 10 also includes several absorber layers 41, 42, 43 and 44. The absorber layers may be made of an absorbent material such as nylon paper which absorbs the electrolyte in order to provide a substantially uniform distribution of the electrolyte throughout the cell, independent of the orientation of the cell.

In accordance with the present invention, the anode 21, 22 preferably comprises at least about 50 weight percent of an active material selected from Zn, metal hydride (MH), Cd and Fe. More preferably, the active material comprises from about 75 to about 85 weight percent of the anode 21, 22. In addition to the active material, the anode 21, 22 preferably comprises from about 12 to about 20 weight percent of an electrolyte. Suitable electrolytes include aqueous alkaline solutions, such as potassium and/or sodium hydroxide, mixtures of these alkalis with fluoride, and/or various combinations of aqueous alkalis with carbonate, fluoride, and borate, with KOH being preferred in a molar concentration of from about 2 M to about 9 M. The anode 21, 22 also preferably comprises from about 2 to about 5 weight percent of a binder selected from polytetrafluoroethylene and similar perfluoropolymers, e.g., those materials sold under the designation Teflon by DuPont de Nemours and Company, carboxymethylcellulose (CMC) or carboxypolymethylene-acrylic acid copolymer, sold under the designation Carbopol by BF Goodrich Specialty Chemicals, with CMC being preferred for cylindrical cells and Teflon for flat or prismatic cells. The anode may include additional materials other than the active material, electrolyte and binder, provided such additional materials do not substantially adversely effect the operation of the cell.

In accordance with the present invention, the cathode 23, 24 preferably comprises from about 50 to about 85 weight percent manganese oxide and from about 3 to about 15 weight percent bismuth, based on the manganese oxide content. The bismuth may be present in the cathode 23, 24 in various forms such as $Bi(OH)_4^-$, $BiO_2^-$, Bi metal, $Bi^{3+}$, and various transient $Bi^{2+}$ and $Bi^+$ species, depending on the electrode potential. In addition to manganese oxide and bismuth, the cathode 23, 24 may further comprise from about 10 to about 45 weight percent of an electronically conductive material. Suitable electronically conductive materials include graphite, carbon, nickel powder, nickel-plated steel, and other materials stable in the range of potential encountered, and mixtures thereof. Such stable materials include cobalt and the noble metals. In a particularly preferred embodiment, the cathode 23, 24 comprises from about 10 to about 45 weight percent graphite as an electrically conductive material. The cathode 23, 24 may further include from about 2 to about 5 weight percent of a binder. Suitable binders include Teflon, CMC, Carbopol, and polyethylene oxide, with Teflon being particularly preferred.

The separator 26 preferably comprises a substrate having a polymeric coating thereon. The substrate is preferably in the form of a membrane such as cellophane, nylon, e.g., the material sold under the designation Pellon by Freudenburg Inc., polypropylene or a composite material sold by Pall-RAI Inc. under the designation PD2193. A particularly suitable substrate includes a microporous polypropylene sold under the designation Celgard 3559 by Hoechst-Celanese Corporation. The polymeric coating disposed on the substrate of the separator preferably comprises a material such as sulfonated polyphenylene oxide (SPPO) or its derivatives. A particularly preferred polymeric coating comprises sulfonated poly(2,6 dimethyl-1,4 phenylene) oxide, prepared by sulfonating poly(2,6 dimethyl-1,4 phenylene) oxide, which is sold by General Electric Specialty Chemicals under the designation Blendex. The sulfonation process may use chlorosulfonic acid, as described by Huang and Kim in *J. Applied Polymer Science*, Vol. 29, p. 4017, 1984. The substrate and polymeric coating of the separator 26 are selected such that Bi species are substantially prevented from moving from the cathode 23, 24 to the anode 21, 22 during operation of the battery cell 10.

In accordance with a particularly preferred embodiment of the present invention, the membrane separator 26 comprises a coating of sulfonated polyphenylene oxide (SPPO) such as sulfonated poly(2,6 dimethyl-1,4 phenylene) oxide on a separator substrate such as cellophane, nylon (e.g., Pellon) or microporous polypropylene (e.g., Celgard 3559). Such a coating may reduce the $Zn(OH)_4^{2-}$ permeability of Celgard 3559 by 92–97%, from 1.35 mg-cm$^{-2}$h$^{-1}$ to 0.045–0.103 mg-cm$^{-2}$h$^{-1}$ in the presence of 9 molar KOH without appreciably affecting the ionic resistance of the separator in KOH electrolyte. SPPO-coated Celgard 3559 separators in rechargeable cells with zinc anodes show much better performance than those with conventional Nafion separators, which are chemically similar due to the presence of sulfonate groups. However, the sulfonate groups in the perfluorinated Nafion material are much less selective to larger anions such as $Zn(OH)_4^{2-}$ compared with small anions such as OH$^-$. This reflected by the very small effect of SPPO on OH$^-$ ion conductivity, compared with that on zincate ion transport.

The anode 21, 22 and the cathode 23, 24 of the battery cell 10 are preferably assembled in the charged state. However, assembly in a discharged or partially charged state is also possible. For example, assembly in the discharged state may take place with an anode containing zinc oxide and/or hydroxide and a cathode containing manganous hydroxide with bismuth and/or lead additives. As another example, assembly may take place in an intermediate state of charge using suitable mixtures of zinc and zinc oxide and/or hydroxide as the anode and mixtures of manganese oxides such as $Mn_2O_3$ or hydroxides with bismuth and/or lead additives as the cathode.

Figure 2:
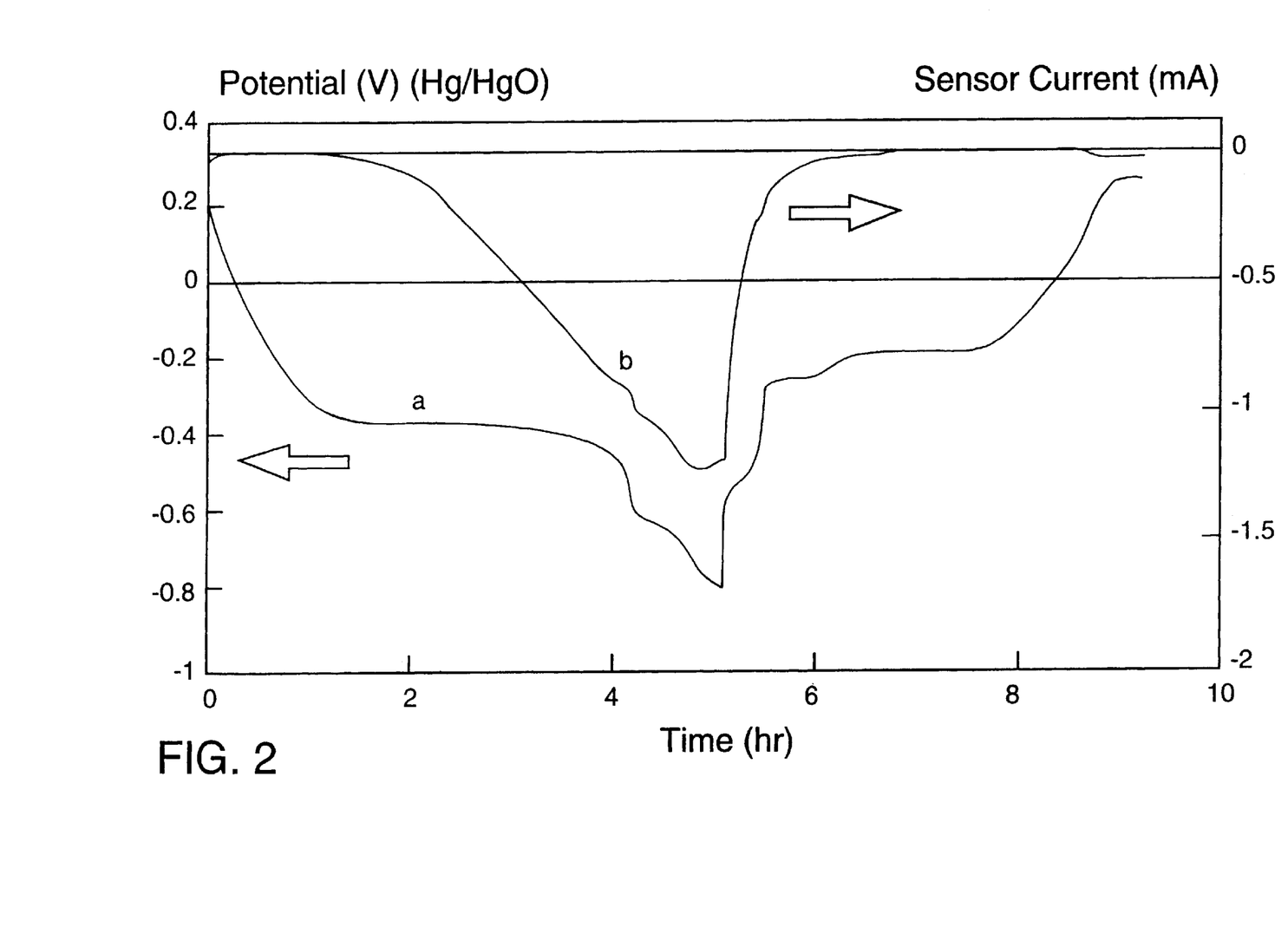

As shown in FIG. 2, at the beginning of discharge, coulombic measurements taken using a nickel sensor electrode show that dissolved bismuth cannot be detected in the 9 molar KOH electrolyte. However, as discharge proceeds, dissolved bismuth is detected as shown in curve b of FIG. 2. At the end of discharge, a shoulder is noted in the discharge curve at –0.6 V versus Hg/HgO, which corresponds to the deposition of metallic bismuth. The potential of this shoulder corresponds to the thermodynamic value for bismuth metal deposition. Finally, as charge proceeds into the Mn$^{3+}$ range, dissolved bismuth disappears from the electrolyte, as is shown in FIG. 2. This indicates that bismuth is combined with Mn$^{4+}$ and apparently also with Mn$^{3+}$ as an insoluble mixed oxide, or alternatively as an insoluble bismuthate, but is not combined with Mn$^{2+}$ in this active secondary cathode material. The long –0.4 V vs Hg/HgO (1.0 V vs zinc) plateau is apparent in FIG. 2. It is only seen if the electrode has been fully reduced to the potential corresponding to the metallic bismuth deposition at –0.6 V vs Hg/HgO or 0.8 V vs. zinc.

Figure 3:
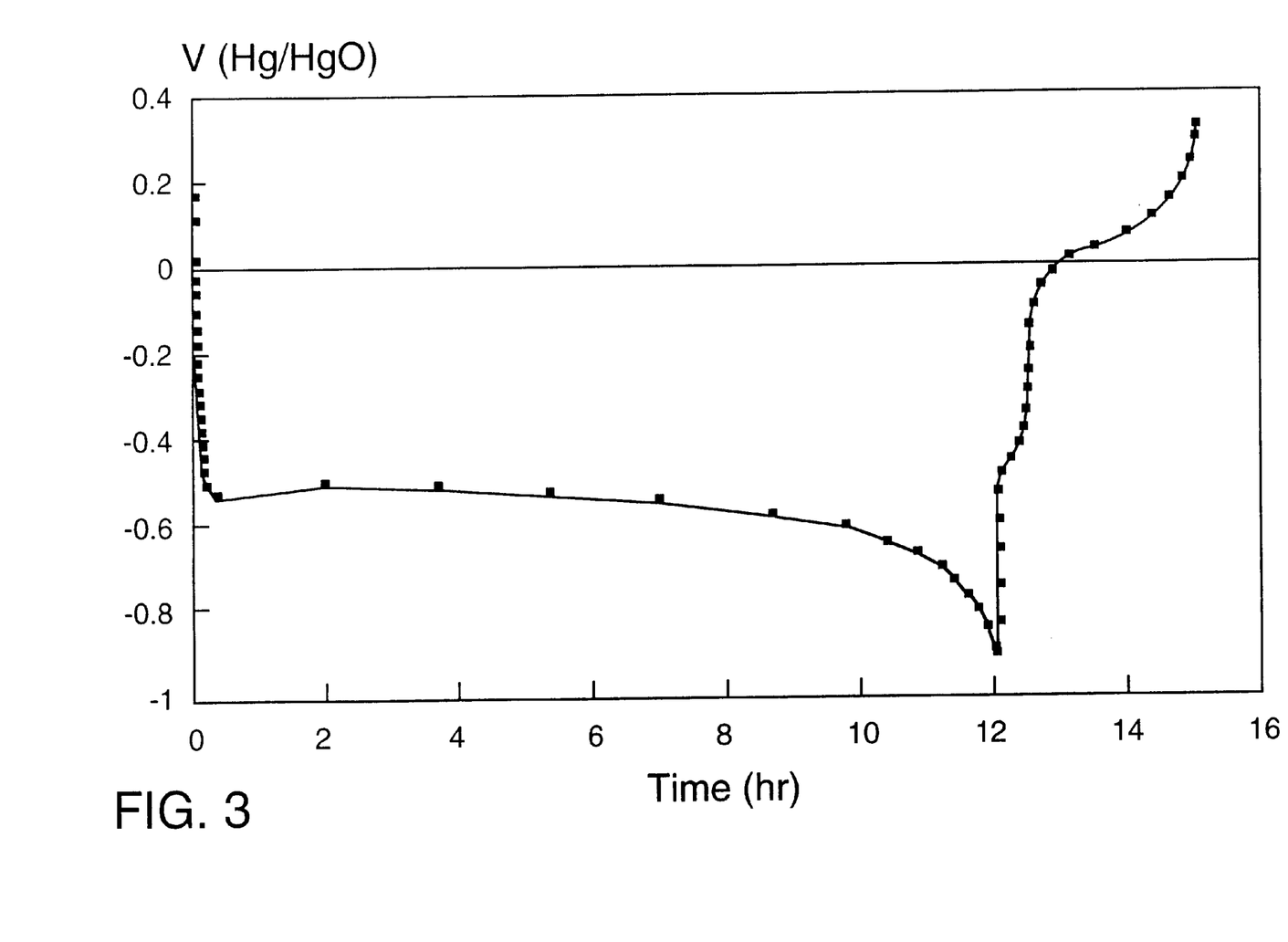
FIG. 3 is a graph showing a long plateau during discharge at a potential near the Bi-deposition potential, indicating that the Mn is discharging chemically. The curve also shows that after this type of behavior, the electrode does not charge fully as indicated by the charge time which is much smaller than the discharge time.

FIG. 3 illustrates a long plateau during discharge at a potential near the Bi-deposition potential, indicating that the Mn is discharging chemically. The curve also shows that after this type of behavior, the electrode does not charge fully as indicated by the charge time which is much smaller than the discharge time. Metallic bismuth requires a suitable electronically conducting surface for deposition, and will not deposit on an oxide or hydroxide, specifically $Mn(OH)_2$. Scanning electron microscopic and electron-microprobe analysis has shown that it occurs only on the graphite or carbon component of the electrode, and it is not visible on the hexagonal 3.5–5.5 micron diameter $Mn(OH)_2$ platelets which are the product of reduction. If a sufficient surface area of carbon is not provided, as for example if 35 weight percent of graphite flakes with an average diameter of about 10 microns and an average thickness of 4 microns are used in a composition containing 60 weight percent of the modified $MnO_2$ material whose bismuth-containing component is that described in U.S. Pat. No. 5,419,986, the electrode may fail to charge in a satisfactory manner. After charging to less than the previously discharged capacity, it will discharge giving a curve as in FIG. 3, which indicates only the discharge of dissolved bismuth oxide (i.e., bismuthate, $Bi(OH)_4^-$ or $BiO_2^-$). This indicates that with this electrode composition, the Mn$^{3+}$ species inefficiently produced on charge are not in contact with an electronic current collector, i.e., carbon or graphite. For this reason, they cannot be electrochemically oxidized to Mn$^{4+}$ species.

The charge reactions on efficient cycles are as follows. First the following electrochemical step occurs:

$$\tfrac{1}{3}Bi + \tfrac{4}{3}OH^- \rightarrow \tfrac{1}{3}Bi(OH)_4^- + e^-; \tag{1}$$

which is followed by an inverse chemical step:

$$\tfrac{1}{3}Bi(OH)_4^- + Mn(OH)_2 \rightarrow \tfrac{1}{3}Bi + MnO(OH) + H_2O + \tfrac{1}{3}OH^-. \tag{2}$$

The above reactions have been written as involving Bi metal. However, Bi$^{2+}$ or Bi$^+$ species are equally possible at potentials exceeding 1.0 V vs. zinc. Reaction Nos. 1 and 2 may occur via lower-valency soluble bismuth species with short lifetimes as intermediates. Reaction No. 2 can occur anywhere in the electrode structure, whereas Reaction No. 1 requires the presence of a carbon conductor. Provided that MnO(OH) is also formed in close contact with an electronic conductor (carbon), the following reaction will then occur:

$$MnO(OH) + OH^- \rightarrow \gamma MnO_2 + H_2O + e^- \tag{3}$$

An alternative step occurring in the presence of soluble Bi$^{3+}$ is disproportionation of the Mn$^{3+}$ species, i.e., MnO(OH):

$$2Mn^{3+} \rightarrow Mn^{4+} + Mn^{2+} \tag{4}$$

This is followed by recycling of Mn$^{2+}$ via Reaction No. 2. The crystallography of this system in the presence of Bi$^{3+}$ has been studied by Bode et al. (*J. Electrochemical Society*, Vol. 144, p. 792 (March 1997)).

Figure 4:
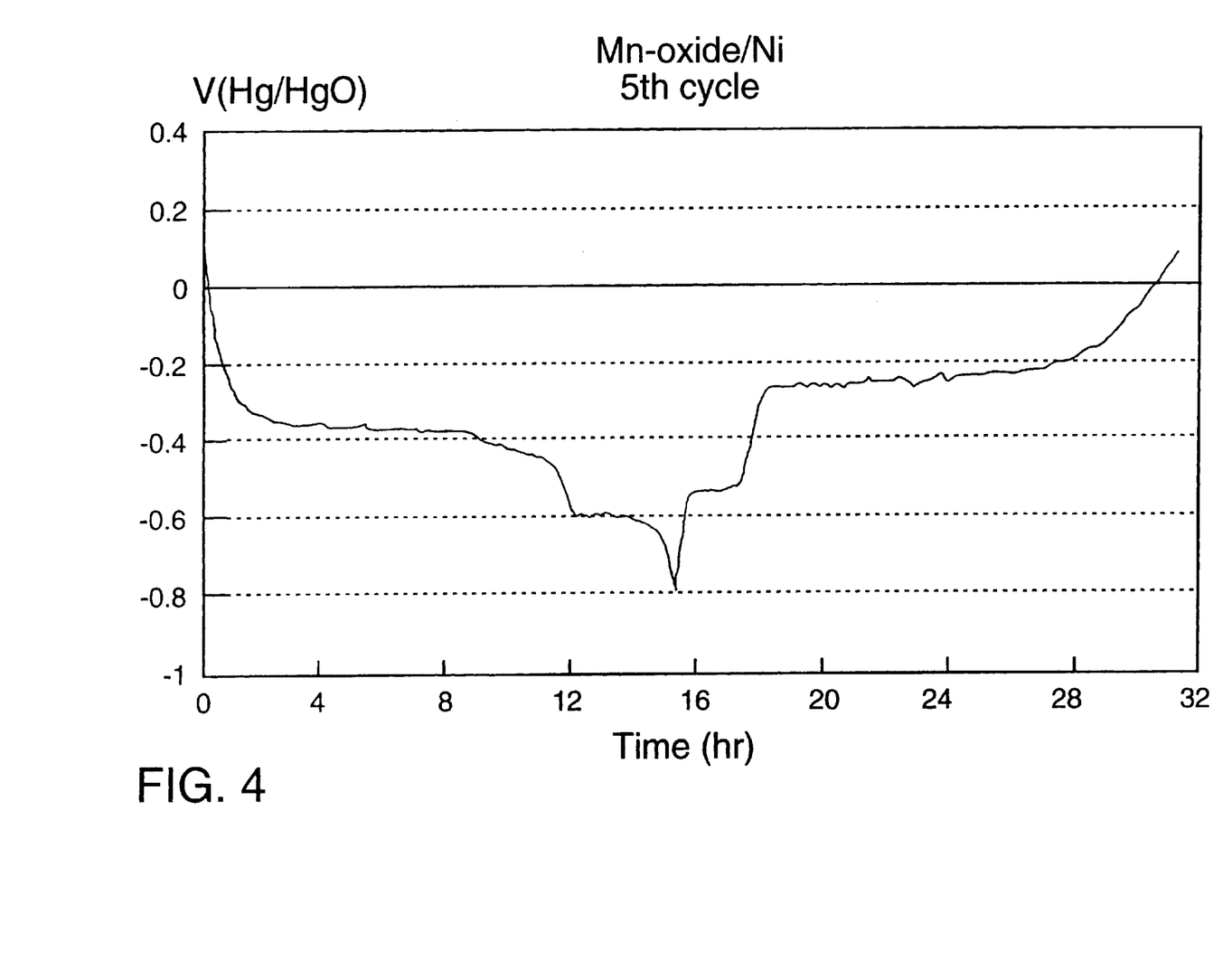
FIG. 4 is a graph showing the fifth cycle for an electrode of a battery cell with Ni as the counterelectrode. In the case of Ni, where Bi cannot be deposited, the electrode cycles well.

As shown in FIG. 4, the discharge plateau at about 1.0 V versus zinc indicates that the inverse of Reaction No. 4 occurs during this process. These sequences demonstrate the importance of suitable electronic conductors of high surface area in intimate contact with the active components in the system. Whereas electrodes containing only 5 weight percent of 10 micron graphite show excellent bulk electronic conductivity, they will not cycle because good microscopic particle-to-particle contact does not occur. Such electrodes will only cycle efficiently with compositions containing about 45 weight percent of graphite or greater. To fabricate electrodes which cycle efficiently for many cycles exceeding 67 percent of two-electron capacity in mixtures with high volume capacity with 70 percent of active material or greater, special mixes of high-surface area carbons or graphites may be required.

Figure 5:
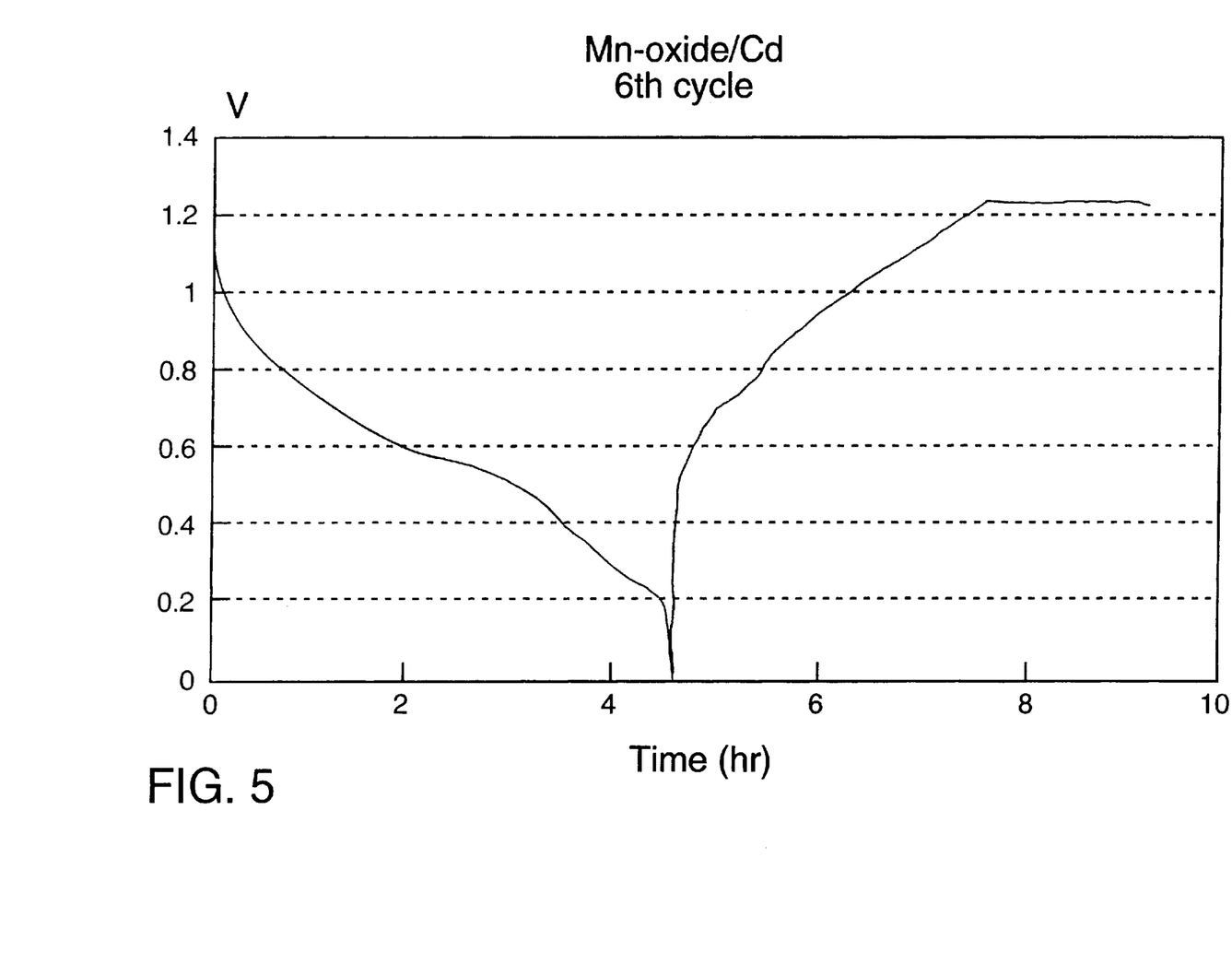
FIG. 5 is a graph showing the fifth cycle for an electrode of a battery cell with Cd as the counterelectrode. In the case of Cd, where Bi can deposit on the Cd-electrode and can be lost from the modified Mn-oxide electrode, the capacity is substantially reduced. Also, the electrode has lost much of its discharge characteristics such as well defined Bi-deposition and dissolution plateaus.

Whereas electrochemical cycling of the modified $MnO_2$ cathode material described in U.S. Pat. No. 5,419,986 will clearly not benefit from the use of a separator which is selective to zincate ion, if bismuth in its soluble form is lost from the cathode environment, rechargeability will be limited. This is illustrated by the results obtained using the cathode composition containing 50 weight percent of the modified $MnO_2$ material whose bismuth-containing component is that described in U.S. Pat. No. 5,419,986, in combination with a cadmium negative electrode. Cadmium oxides are very insoluble, and do not affect the cathode compound in any significant way. However, on cycling, rechargeability is quickly lost over a few cycles, as shown in FIG. 5. This is explained by the fact that $Bi(OH)_4^-$ can diffuse through a conventional polypropylene or cellophane separator and deposit on the cadmium anode, where it is seen as a black powdery deposit, similar to the deposit which forms on zinc anodes when bismuth oxide is used in modified positive compositions, and which results in hydrogen formation (gassing) at the zinc anode.

The passage of bismuthate across the separator is demonstrated by the coulombic results shown in FIG. 5. It is noted that cellophane is an excellent barrier to $Zn(OH)_4^{2-}$, but it is clearly not to $Bi(OH)_4^-$. Thus, membranes which prevent passage of $Zn(OH)_4^{2-}$, do not necessarily prevent passage of $Bi(OH)_4^-$. Thus, the discovery or development of such membrane in accordance with the present invention is unexpected.

Figure 6:
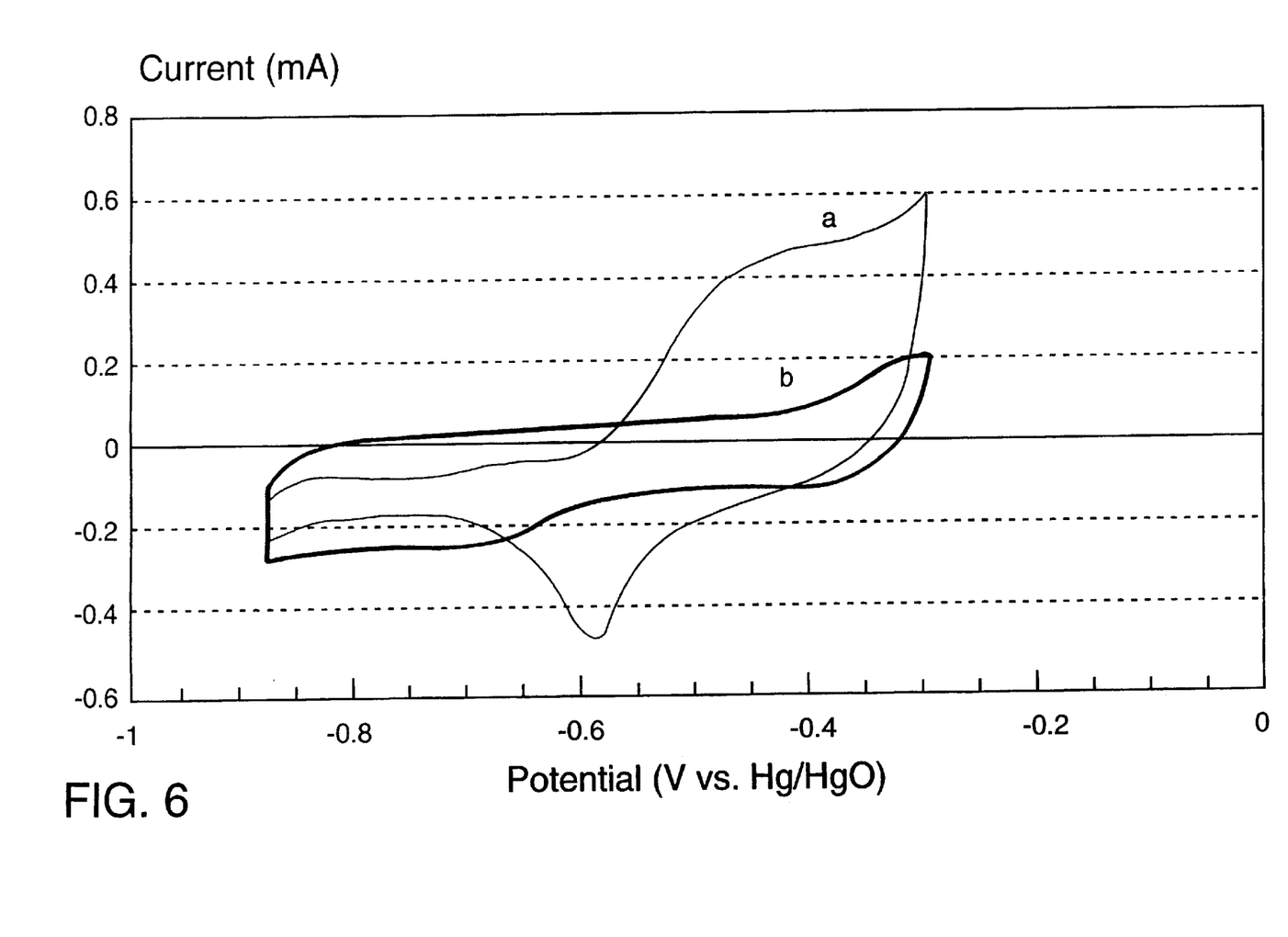
FIG. 6 is a graph showing the passage of Bi through uncoated (a) and coated (b) battery cell separators after 18 hours. The figure shows that Bi passes through the uncoated separator but not through the coated separator of the present invention. The presence of Bi which has passed through the uncoated separator is shown by the cathodic peak at approximately −0.6 V vs Hg/HgO in the cyclic voltamogram.

FIG. 6 shows the passage of Bi through uncoated (a) and coated (b) separators after 18 hours, demonstrating that Bi passes through the uncoated separator but not through the coated separator of the present invention. The presence of Bi on the other side is shown by the cathodic peak at approximately 0.6 V vs Hg/HgO in the cyclic voltamogram. In accordance with the present invention, the use of a separator which is selective to $Bi(OH)_4^-$ ions greatly enhances charging of the modified $MnO_2Bi$—Zn secondary cell. Commercial materials tested show little ability to prevent transport of $Bi(OH)_4^-$, as shown by curve a in FIG. 6. Even commercial materials which are claimed to be selective to $Zn(OH)_4^{2-}$ show little selectivity to $Bi(OH)_4^-$. However, the SPPO coated material showed excellent selectivity, as the results in curve b of FIG. 6 illustrate.

Figure 7:
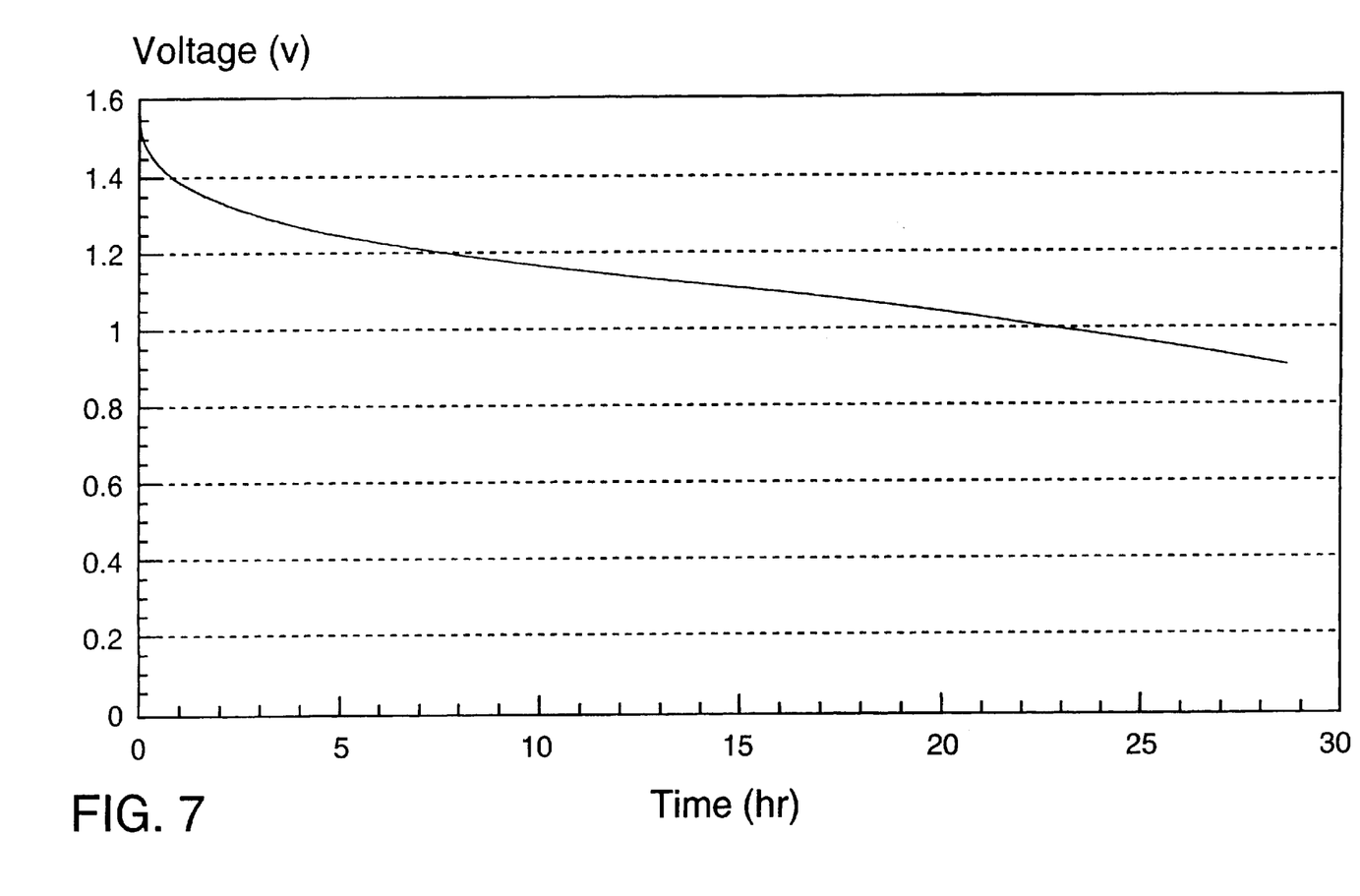
FIG. 7 is a graph showing the fifth discharge curve of a C-size battery cell containing an Mn-oxide positive electrode and coated separator in accordance with an embodiment of the present invention.

As the following examples indicate, if the positive electrode is not reduced below 0.8 V, the Mn-oxide species undergoing the charge mechanism via $Mn(OH)_6^{3-}$ do not form, or form incompletely. Thus, the electrode charges in the same manner as one consisting of pure electrolytic $MnO_2$, i.e, only the $Mn^{3+}$ to $Mn^{4+}$ step is operative. However, the presence of $Bi^{3+}$ allows any $Mn(OH)_2$ which may be formed to oxidize via the above mechanism. Such electrodes are therefore protected against irreversible overdischarge. Even so they have discharge curves which are closer to that of $\gamma$-$MnO_2$, even after several cycles, as shown in FIG. 7. This allows such secondary cells, when discharged to normal cut-off voltages (1.0–0.9 V for ordinary applications) to replace throwaway alkaline and secondary nickel-cadmium and nickel-hydrogen cells on an equivalent basis.

The following examples are intended to illustrate various aspects of the present invention, and are not intended to limit the scope thereof.

EXAMPLE 1

A 1 inch by 1 inch cathode pressed to a nickel gauze current collector is produced from 1 gram of porous cathode mix prepared according to one or more of Examples 4 to 7 of U.S. Pat. No. 5,419,986. A porous anode mix is prepared by mixing 11.8 grams of zinc powder, 7.2 grams of zinc oxide, 0.5 grams of cadmium oxide, 0.5 grams of lead oxide, and 1 gram of colloidal polytetrafluoroethylene suspension sold under the designation Teflon 30 by DuPont de Nemours and Company. An anode is prepared by pressing 1.5 grams of the anode mix onto a 1 inch by 1 inch copper gauze current collector. A separator is prepared consisting of a PD2193 composite substrate coated on both sides with sulfonated Blendex polymeric coating. The polymeric coating is prepared by sulfonating Blendex using the method described by Huang and Kim cited above, dissolving the product in methanol to give a 5 weight percent solution, followed by dip-coating of the substrate and drying. The anode and cathode are placed in close proximity to each other in a container with the separator between. The two current collectors are welded to external connecting wires. A total of 6 cc of 3.5 M KOH and 3 M KF electrolyte is added to the anodic and cathodic compartments to complete the charged electrochemical cell.

EXAMPLE 2

Upon testing, the cell produced in Example 1 is found to have a capacity of about 225 mAh. It may be discharged in the current range from 15 mA to 50 mA, but discharge current may exceed or be inferior to the extremes of this range. If the cut-off voltage at the end of discharge is superior to about 0.9 V, equivalent to −0.5 V versus the mercury/mercury oxide reference electrode on the scale shown in FIG. 4, and the cell is then charged at constant charge current in the same range as that for discharge, the next and all subsequent discharge curves are as shown in FIG. 7. This gives a cell performance with an average discharge voltage of about 1.2 V, mimicking that of a nickel-cadmium battery, and allowing the cell to substitute for the latter in electrical equipment on a one-on-one basis. However, this discharge protocol may not permit the use of the full two-electron capacity available in the modified manganese oxide positive material.

EXAMPLE 3

The cell produced in Example 1 may be discharged in the same current density range as that in Example 2, to a cut-off voltage less than about 0.8 V, and subsequently charged in the same current density range as that in Example 2. The next and subsequent discharge will then resemble the curve shown in FIG. 4, in which the majority of the discharge plateau is slightly higher than 1.0 V versus zinc, or the equivalent of −0.45 versus the mercury/mercury oxide reference electrode on the scale shown in FIG. 4. This discharge protocol allows the full capacity available in the modified manganese oxide positive material to be used.

Whereas particular embodiments of this invention have been described above for purposes of illustration, it will be evident to those skilled in the art that numerous variations of the details of the present invention may be made without departing from the invention as defined in the appended claims.

What is claimed is:

1. A rechargeable electrochemical cell comprising:
   a housing;
   an anode within the housing comprising from about 50 to about 85 weight percent active material;
   a cathode within the housing comprising $MnO_2$, and a chemical source of bismuthate ions comprised of bismuth metal or a bismuth compound;
   and an electrolyte;
   wherein bismuthate ions from said chemical source are freely movable in said electrolyte; and
   a separator between the cathode and the anode for substantially preventing the bismuthate ions in the electrolyte from moving from the cathode to the anode.

2. The rechargeable battery cell of claim 1, wherein the active material of the anode comprises Zn.

3. The rechargeable battery cell of claim 2, wherein the active material comprises from about 75 to about 85 weight percent of the anode.

4. The rechargeable battery cell of claim 2, wherein the anode further comprises from about 12 to about 20 weight percent of the electrolyte.

5. The rechargeable battery cell of claim 4, wherein the electrolyte comprises from about 2 to about 9 molar KOH.

6. The rechargeable battery cell of claim 2, wherein the anode further comprises from about 2 to about 5 weight percent of a binder.

7. The rechargeable battery cell of claim 1, wherein the cathode comprises from about 50 to about 85 weight percent $MnO_2$ and from about 5 to about 15 weight percent bismuth oxide based on the weight percent of the $MnO_2$.

8. The rechargeable battery cell of claim 1, wherein the bismuth is in the form of $Bi(OH)_4^-$, $Bi_2O_3$, Bi metal, $Bi^+$, $Bi^{2+}$ or $Bi^{3+}$.

9. The rechargeable battery cell of claim 1, wherein the electrolyte comprises from about 2 to about 9 molar KOH.

10. The rechargeable battery cell of claim 1, wherein the cathode further comprises from about 10 to about 45 weight percent of an electrically conductive material.

11. The rechargeable battery cell of claim 10, wherein the electrically conductive material is selected from the group consisting of graphite, carbon, Ni, stainless steel, Co and mixtures thereof.

12. The rechargeable battery cell of claim 1, wherein the cathode further comprises from about 2 to about 5 weight percent of a binder.

13. The rechargeable battery cell of claim 1, wherein the separator comprises a substrate and a polymeric coating on the substrate.

14. The rechargeable battery cell of claim 13, wherein the substrate comprises a material selected from the group consisting of cellophane, nylon and polypropylene.

15. The rechargeable battery cell of claim 13, wherein the polymeric coating comprises a material selected from the group consisting of sulfonated polyphenylene oxide and its derivatives.

16. The rechargeable battery cell of claim 1, wherein the cathode comprises from about 50 to about 85 weight percent $MnO_2$ and from about 5 to about 15 weight percent bismuth oxide based on the weight percent of the $MnO_2$, the anode comprises from about 75 to about 85 weight percent Zn, and the separator comprises a substrate with a coating of sulfonated polyphenylene oxide thereon.

17. The rechargeable battery cell of claim 2, wherein the battery cell is capable of being cycled to a cut off discharge voltage of greater than about 0.9 V.

18. The rechargeable battery cell of claim 17, wherein the battery cell exhibits a discharge curve centered at about 1.2 V.

19. The rechargeable battery cell of claim 2, wherein the battery cell is capable of being cycled to a cut off discharge voltage of less than about 0.8 V.

20. The rechargeable battery cell of claim 2, wherein the battery cell exhibits a discharge curve centered at from about 1.0 to about 1.1 V.

21. A method of improving the recharging characteristics of a rechargeable electrochemical cell comprising:

a housing;

an anode within the housing comprising from about 50 to about 85 weight percent active material;

a cathode within the housing comprising $MnO_2$, and a chemical source of bismuthate ions comprised of bismuth metal or a bismuth compound;

and an electrolyte; wherein the bismuthate ions from the chemical source are freely movable in said electrolyte;

said method comprising the step of providing a separator between the cathode and the anode capable of substantially preventing the bismuthate ions in the electrolyte from moving from the cathode to the anode.

22. The method of claim 21, further comprising providing the anode and the cathode within the housing in a charged state.

23. The method of claim 21, further comprising providing the anode and the cathode within the housing in a partially charged state.

24. The method of claim 21, further comprising providing the anode and the cathode within the housing in a discharged state.

25. A method of recharging an electrochemical cell comprising:

a rechargeable electrochemical cell including:

a housing;

an anode within the housing comprising from about 50 to about 85 weight percent-active material;

a cathode within the housing comprising $MnO_2$, and a chemical source of bismuthate ions comprised of bismuth metal or a bismuth compound and an electrolyte in which the bismuthate ions from the chemical source are freely movable;

a separator between the cathode and the anode said method comprising the steps of substantially preventing the bismuthate ions from moving from the cathode to the anode; and repeatedly discharging and charging the cell.

26. The method of claim 25 wherein the active material of the anode is zinc.

27. The method of claim 26, further comprising cycling the battery cell to a cut-off discharge voltage of greater than about 0.9 V.

28. The method of claim 27, further comprising discharging the battery cell at a voltage centered at about 1.2 V.

29. The method of claim 26, further comprising cycling the battery cell to a cut-off discharge voltage of less than about 0.8 V.

30. The method of claim 29, further comprising discharging the battery cell at a voltage centered at from about 1.0 to about 1.1 V.

* * * * *